Feb. 14, 1956  J. C. MOERK  2,735,026
SUBMERSIBLE MOTOR COOLING
Filed July 28, 1954  2 Sheets-Sheet 1

INVENTOR.
JOHN C. MOERK
BY
Paul L. Keohen
ATTY.

Feb. 14, 1956 J. C. MOERK 2,735,026
SUBMERSIBLE MOTOR COOLING
Filed July 28, 1954 2 Sheets-Sheet 2
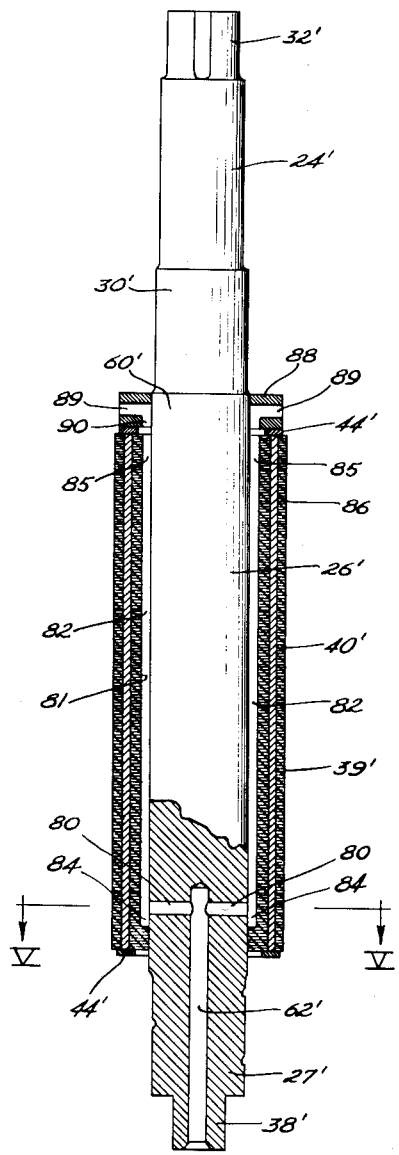
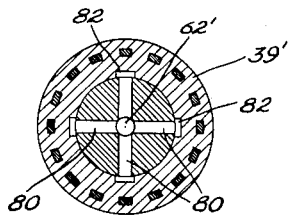
INVENTOR.
JOHN C. MOERK
BY
Paul L. Keeler
ATTY.

United States Patent Office 2,735,026
Patented Feb. 14, 1956

2,735,026

SUBMERSIBLE MOTOR COOLING

John C. Moerk, Freeport, Ill., assignor to Fairbanks, Morse & Co., Chicago, Ill., a corporation of Illinois Application July 28, 1954, Serial No. 446,311

3 Claims. (Cl. 310—54)

This invention relates to improvements in electric motor means provided for pump operation in deep wells or the like, wherein the motor means is intended for location in submergence in the well fluid to be pumped. More particularly, the present improvements concern effective cooling of the motor parts within an enclosing casing, by an improved manner of circulating fluid coolant within the casing in effective heat absorbing relation to the motor parts therein and in heat transferring relation to the surrounding well fluid through wall portions of the casing.

In submersible pump units wherein the electric motor part thereof is totally enclosed by a casing sealed against entrance of well fluid, and wherein the sealed casing contains a suitable fluid coolant such as a dielectric oil or the like, it is most important to afford positive circulation of the cooling fluid in effective heat absorbing relation to the motor rotor structure in particular, and the motor stator and shaft bearings. Among heretofore known and prevailing forms of coolant circulating systems employed in connection with submersible electric motors, certain thereof have utilized axial and radial shaft boring to conduct cooling fluid to various portions of the motor rotor. But in such instances and particularly in cases where the motor length is many times the overall diameter of the motor, as for example in a submersible motor of six inch casing diameter and a length of four feet, the axial portion of the shaft boring extends through the major portion of the shaft length. Such long shaft boring is both difficult and costly to produce.

Accordingly, it is an object of the present invention to provide an improved, positive coolant circulating system for submersible motors of the character indicated, which is highly effective particularly in respect to the cooling of the motor rotor, and which avoids the use of long axial shaft boring.

Another object is to afford an improved coolant circulating system in a submersible motor, which provides for positive flow of coolant in heat absorbing contact with the rotor core member internally thereof, as well as in external contact with the member.

A further object is to provide an improved coolant circulating system embodying a pump means near each end of the motor rotor part, wherein the pump means are in series-flow connection through passage means internally of the motor rotor.

These and other objects and advantages of the invention will become apparent from the following description of a presently preferred embodiment thereof and certain modifications, all as illustrated in the accompanying drawing, wherein:

Fig. 4 is a longitudinal sectional elevation of a submersible motor rotor structure illustrating a further modification in the invention, and Fig. 5 is a transverse sectional elevation through the rotor of Fig. 4 as taken along the lines 5—5 therein.

Figure 1:
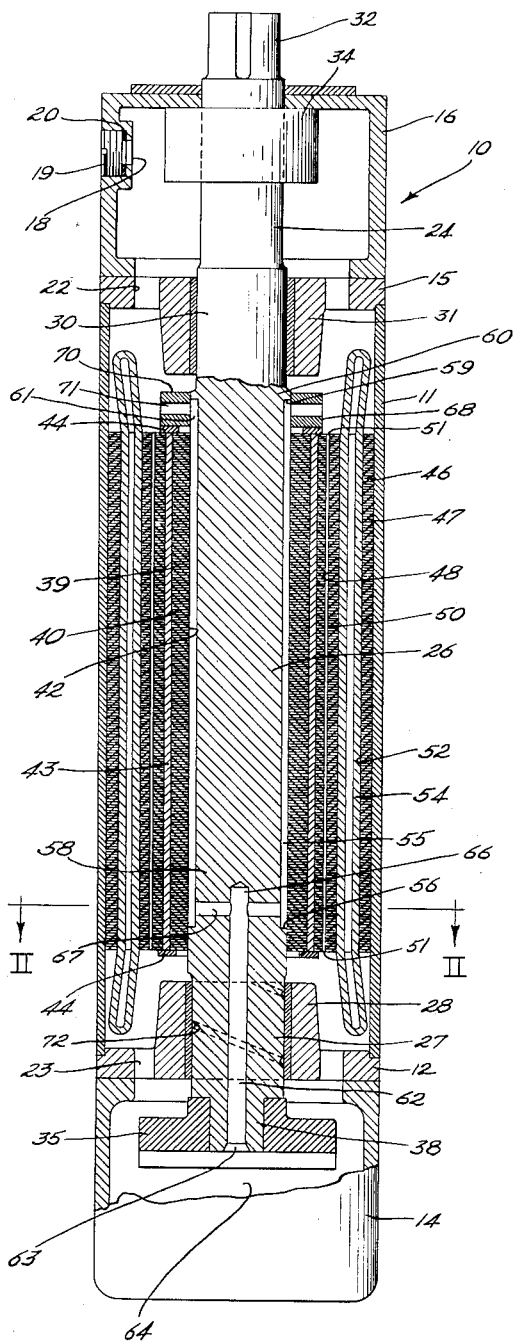
Fig. 1 is a view in longitudinal section through a submersible motor, showing one form of the invention in application to the motor.
Figure 2:
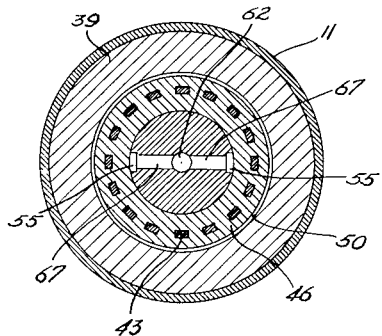
Fig. 2 is a sectional elevation transversely through the motor, as taken along line 2—2 in Fig. 1.

Referring to the drawing and first to the embodiment of the invention illustrated in Figs. 1 and 2, there is shown at 10 in longitudinal sectional elevation a submersible type motor suitable for application to submersible pump units for operating the pump part thereof which is not here shown. The motor comprises a housing or casing structure including a central tubular section 11, lower bearing bracket 12, a lower end casing section 14, an upper bearing bracket 15 and upper end section 16. The sections of the casing structure are suitably connected together. The casing assembly having the motor parts therein as will be presently described, is adapted to be filled with a fluid coolant such as a high strength dielectric oil or the like. Filling of the casing with such fluid coolant may be effected as through a filler opening 18 in the upper casing section 16, which opening normally is closed by a plug 19 and seal washer 20. The upper casing section 16 is open to the central section 11 through ports 22 in bearing bracket 15, while the central casing section and the lower casing section 14 are similarly in communication through ports 23 in lower bearing bracket 12. Extending longitudinally in the casing centrally thereof, is a rotor shaft 24 providing an intermediate cylindrical section 26 between the bearing brackets, a lower stepped end 27 of reduced diameter journalled in a bearing sleeve 28 carried by the bearing bracket 12, and an upper stepped section 30 similarly journalled in a bearing sleeve 31 supported by the upper bearing bracket 15. The upper end section 30 of the shaft is extended for projection exteriorly of the casing as at 32, as for driving connection to a pump (not shown), the shaft in its extension from the casing being sealed by a suitable shaft seal structure generally indicated at 34 disposed in the upper casing section 16. The lower end section 27 of the shaft in addition to its radial support by the bearing sleeve 28, is axially supported by a suitable thrust bearing which is here shown only in part, as the shaft carried portion generally indicated at 35 adapted for cooperation with a frame supported bearing portion (not shown) located in the lower casing section 14. The portion of the shaft supported by the thrust bearing 35, is extended downwardly therethrough as at 38 so as to have its outer end exposed to the interior of casing section 14, as for a purpose later to appear.

Mounted upon and secured to the center cylindrical section 26 of the shaft 24 is a motor rotor structure 39 comprising an annular rotor core element 40 of laminated construction having the shaft-receiving bore 42 and including a squirrel-cage winding comprised of copper bars 43 and opposite end rings 44. Surrounding the rotor concentrically thereof, is a stator member or structure 46 comprising an annular core 47 having an internal rotor bore 48 which cooperates with the periphery of the rotor to form an annular gap 50 which is open at its opposite ends 51 to the casing interior. The stator core positioned in securement to the casing 11, is suitably apertured longitudinally therethrough to provide a plurality of coil winding passages 52 to receive coil windings 54. In the present embodiment of the invention, the stator winding passages 52 are of such size as to afford with the coil windings therein, sufficient clearance for the flow of fluid coolant through these passages to assist in stator cooling.

Turning now to the present improvements for effecting positive circulation of the cooling fluid in the casing in heat absorbing relation to the motor rotor and stator parts and the several shaft bearings, the rotor shaft 24 is formed to provide in its intermediate cylindrical section 26, one or more peripheral recesses in the form of grooves or channels 55 (two such grooves being shown in diametrically opposite relation). Each groove or channel extends longitudinally of the shaft section and terminates in an end wall 56 inwardly near the lower end 58 of shaft section 26, the groove also terminating at its other end in an end wall 59 inwardly adjacent the upper end 60 of shaft section 26. These grooves cooperate with the overlying bore wall of the rotor core 40 to form passage means or passageways which are closed at their lower ends, as by the end walls 56 and the adjacent overlying portion of the rotor core, and extend at 61 upwardly beyond the upper end of the core and its upper end ring 44, as shown in Fig. 1.

Extending axially through the lower end sections 27 and 38 of the shaft is a passage or shaft bore 62 open at its lower end 63 to the chamber 64 of casing section 14, the shaft bore being continued a relatively short distance in the shaft section 26 to a terminal end 66 in the region of the lower closed ends of the passageways 55. The axial bore near its inner end 66 is in communication with the lower ends of the passageways 55 through lateral shaft bores 67 preferably extending radially in the shaft, there being one such radial bore for each passageway 55. The axial and radial shaft bores, 62 and 67 respectively, comprise in effect a centrifugal pump for effecting positive flow of fluid coolant from the lower casing chamber 64 into and along the passageways 55 between the rotor core and shaft, for absorbing heat from these parts and hence cooling the latter.

Carried by the shaft adjacent the upper end of the rotor core member 40 is a second pump device 68 comprised of an annular member or ring 70 seated upon the upper end 60 of the intermediate shaft section 26 and suitably secured thereto (not shown) for rotation with the shaft. Pump ring 70 in side abutment with the rotor end ring 44, overlies the ends 61 of the passageways 55 and is provided with radial passages or bores 71 each open at its inner end to the end 61 of one of the passageway 55. The outer ends of the ring bores 71 open at the ring periphery, to the casing interior of the region thereof relatively near the upper open end 51 of the gap 50 and the upper ends of the stator winding passages 52. Thus in rotation of the motor rotor, pump ring 70 will operate to effect positive discharge of fluid coolant from the passageways 55 into the casing for flow therein both upwardly through the ports 22 into the upper casing section 16, and downwardly in and through the gap 50 and winding passages 52, the latter flow ultimately reaching the lower casing chamber 64 through ports 23 and a helical passage 72 provided in the journal portion of the shaft end section 27.

In motor operation, the fluid coolant entering the lower casing chamber 64 will be cooled in substantial degree by heat transfer therefrom through the chamber wall to the surrounding body of fluid or water in which the motor is submerged. Thence under the pumping action of the lower pump means constituted by the shaft bores 62 and 67, the cooled fluid is delivered by each pump into the passageways 55 for flow therein to cool the rotor core structure. Fluid discharge from the passageways 55, established in positive manner by the upper pump means constituted by pump ring 70, brings the now heated fluid coolant into the upper zone of the casing where some heat transfer will take place through the upper end of casing section 11 to the external surrounding well water, while additional heat transfer will be effected in respect to the fluid flowing through the upper casing section 16. Also, in this portion of the fluid circulating system, the fluid will effect cooling of the upper shaft bearing. From the upper casing portions the fluid enters the gap 50 and the stator winding passages 52, flowing downwardly therein in heat-absorbing relation to the adjacent motor parts, and eventually returning to the lower casing chamber 64 for cooling and recirculation in the course above described.

The now improved cooling arrangement thus provides, as described, separate pump means at each end of the motor rotor which are in series relation in the fluid circulation course. While the pump near the upper end of the motor is constituted by a separate pump ring (70) fixed on the shaft, the lower pump means is directly embodied in the rotor shaft, being constituted by the axial bore 62 and radial bores 67. Moreover and importantly in regard to the lower pump, this pump delivers into the adjacent lower ends of the rotor passageways 55, so that the length of the axial bore portion 62 of the pump is relatively short in comparison to the shaft length. Because this bore is of a length only a little greater than the combined length of the connected shaft end portions 27 and 38, it may be produced quite readily and economically. In addition, if for any reason the motor casing should not be substantially filled with fluid coolant, or the coolant should become reduced in volume in the casing through leakage, so that the fluid level therein is somewhat below the upper pump ring 70, the lower pump means provided by the shaft bores 62 and 67 will function to maintain the upper pump ring adequately primed such that it will continue to operate as a pump, in the circulation of the fluid coolant.

Figure 3:
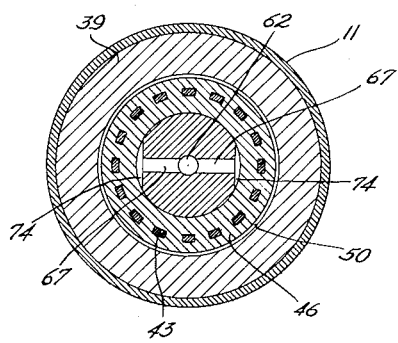
Fig. 3 is a transverse sectional elevation similar to that of Fig. 2, but showing a modification in a portion of the invention.

Instead of forming the internal rotor passageways 55 by grooving or channeling the shaft as shown in Figs. 1 and 2, these may be formed by recessing the shaft in the form of shaft flats 74 as indicated in the sectional view of Fig. 3, or by recessing the bore wall of the shaft-mounted rotor core member as shown by Figs. 4 and 5. In the latter instance, however, some modification, as in respect to the pump ring, is necessary as will be now pointed out in reference to Figs. 4 and 5 wherein the rotor structure shown may be identical, except for the radial shaft bores, rotor passageways and the pump ring, with the rotor of Fig. 1. Hence, for the purpose of description here, corresponding identical parts will be referred to where necessary, by the same reference numerals differentiated only by primes.

The modified rotor includes the shaft 24' having intermediate cylindrical section 26', stepped end section 27' and 38' at the lower end of the shaft and opposite stepped end section 30' inwardly of the shaft output end 32'. Mounted on the cylindrical shaft section is a rotor core structure 39' comprising the laminated core member 40' containing a squirrel-cage winding (not shown) and winding end rings 44'. The pump embodied in the lower end of the shaft, comprises axial shaft bore 62' and a plurality of radial shaft bores 80 each extending to the periphery of the shaft section 26'. Formed in the wall of the shaft-receiving bore 81 of the core member 40' are a plurality of channels 82 each extending longitudinally in the core from its closed lower end 84 to an opening at 85 at the upper end 86 of the core. These channels in cooperation with the shaft section 26', form passageways similar to the passageways 55 of Fig. 1, and each thereof is in fluid receiving communication at its lower closed end 84, with one of the radial pump bores 80. As indicated by the sectional view of Fig. 5, there are four passageways 82 and four radial pump bores 80, although and as hereinbefore stated, any suitable number of such passageways and corresponding number of pump bores may be employed.

The second pump at the upper end of the rotor core, comprises pump ring 88 mounted on shaft section 26' at its upper end 60' with the ring in abutment with the upper end ring 44'. This pump ring has a plurality of radial bores 89 equal in number to the number of passageways 82, opening to the ring periphery. Each such radial bore has its inner or inlet end extended axially of the ring, as at 90, in open opposed relation to the open end 85 of its associated one of the passageways 82.

Having now illustrated and described the invention and the nature of the improvements effected thereby, it is to be understood that various other modifications may be

What is claimed is:

1. In an electric motor, an enclosing casing having communicating main and auxiliary chambers containing fluid coolant, a shaft extending in the casing centrally through the main chamber and having a terminal end portion in said auxiliary chamber, a stator member in the main chamber, a rotor core element on said shaft in cooperative relation to said stator member and forming therewith a gap open at its ends to the main chamber, passageways extending between and longitudinally along the core element and shaft, each having one end thereof open at that end of the core element remote from said auxiliary chamber, each of said passageways further having its opposite end closed and terminating inwardly of the rotor core end near the auxiliary chamber, said shaft providing an axial bore extending through said terminal end portion of the shaft and being open to said auxiliary chamber, and further providing radial bores communicating said axial bore with said passageways adjacent the closed ends thereof, and a ring element on said shaft having radial passages therein each communicating with one of the passageways at its open end, said axial and radial bores being effective for delivering fluid coolant from the auxiliary chamber to said passageways, and said ring through its said radial passages effecting discharge of fluid coolant from the passageways into the main chamber for circulation therein and return through said gap to said auxiliary chamber.

2. In a totally enclosed fluid cooled electric machine, an enclosing casing containing fluid coolant, a shaft rotatably supported in the casing and having a terminal end therein near one end of the casing, a cylindrical rotor core element having an axial shaft bore receiving said shaft therethrough, an annular stator in the casing in surrounding relation to said core element and forming with the latter an annular gap therebetween, with the gap open at its ends to the casing interior, said shaft having peripheral recesses each extending longitudinally thereof and each having a closed end inwardly adjacent one end of said rotor core element near said terminal end of the shaft and an opposite terminal end portion open radially of the shaft adjacently beyond the opposite end of said rotor core element, said recesses in cooperation with the shaft bore of said rotor core element providing fluid passages, the shaft further providing an axial bore open at said terminal shaft end to said one end of the casing and extending in the shaft to a terminal end thereof in the portion of the shaft near said one end of the rotor core element, and radial bores communicating said axial bore near its said terminal end with said fluid passages near said closed ends thereof, and a pump ring on said shaft at said opposite end of the rotor core element, having radial bores communicating at the radially inner ends thereof with said radially open terminal end portions of the shaft recesses and opening at the ring periphery to the casing interior in the zone thereof adjacent one open end of said gap, said axial and radial shaft bores delivering fluid coolant from said one end of the casing to said fluid passages, and said pump ring discharging fluid coolant from said fluid passages into the casing for circulation therein and through said gap to said one end of the casing.

3. As an article of manufacture, a rotor shaft for a totally enclosed, fluid cooled motor of the character described, comprising a solid shaft member providing an intermediate cylindrical section adapted for the mounting of a rotor core thereon, and opposite reduced-diameter end sections, said intermediate cylindrical section being formed to provide peripheral recesses relatively angularly spaced about the section and extending longitudinally thereof, each of said recesses terminating at each end thereof in an end wall inwardly near the adjacent end of said intermediate section, and the shaft member further providing a bore extending axially through one of said end sections with its inner end terminating in the adjacent portion of the intermediate section, and radial bores in the said adjacent portion of the intermediate section communicating said axial bore near its inner terminal end with said recesses, said axial bore opening at the outer end of said one shaft end section.

References Cited in the file of this patent

UNITED STATES PATENTS

| | | |
|---|---|---|
| 1,066,635 | MacDonald | July 8, 1913 |
| 1,448,700 | Seidner | Mar. 13, 1923 |
| 1,655,824 | Schmidt | Jan. 10, 1928 |
| 2,285,436 | Hoover | June 9, 1942 |
| 2,600,277 | Smith | June 10, 1952 |